(12) United States Patent
Morioka

(10) Patent No.: US 12,684,575 B2
(45) Date of Patent: *Jul. 14, 2026

(54) TRANSMITTER AND RECEIVER FOR MULTIPLE CHANNEL OPERATION

(71) Applicant: Sony Group Corporation, Tokyo (JP)

(72) Inventor: Yuichi Morioka, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 433 days.

This patent is subject to a terminal disclaimer.

(21) Appl. No.: 17/389,351

(22) Filed: Jul. 30, 2021

(65) Prior Publication Data

US 2021/0360606 A1 Nov. 18, 2021

Related U.S. Application Data

(63) Continuation of application No. 15/512,851, filed as application No. PCT/EP2015/074564 on Oct. 23, 2015, now Pat. No. 11,089,573.

(30) Foreign Application Priority Data

Oct. 31, 2014 (EP) .................................... 14191328

(51) Int. Cl.
*H04W 72/20* (2023.01)
*H04W 72/0453* (2023.01)
*H04W 84/12* (2009.01)

(52) U.S. Cl.
CPC ....... *H04W 72/20* (2023.01); *H04W 72/0453* (2013.01); *H04W 84/12* (2013.01)

(58) Field of Classification Search
None
See application file for complete search history.

(56) References Cited

U.S. PATENT DOCUMENTS

| | | |
|---|---|---|
| 2005/0250507 A1 | 11/2005 | Leung et al. |
| 2009/0010275 A1 | 1/2009 | Diepstraten et al. |

(Continued)

FOREIGN PATENT DOCUMENTS

| | | |
|---|---|---|
| JP | 2011-211709 A | 10/2011 |
| JP | 2012-501581 A | 1/2012 |

(Continued)

OTHER PUBLICATIONS

"802.11 ac: The Fifth Generation of Wi-Fi Technical White Paper," CISCO, Mar. 2014, pp. 1-25.

(Continued)

*Primary Examiner* — Christine T Duong
(74) *Attorney, Agent, or Firm* — XSENSUS, LLP

(57) ABSTRACT

A transmitter for transmitting data to a receiver in a wireless local area network communication system, including: a candidate channel determination unit configured to determine a candidate channel list including at least one channel being available for transmission at the transmitter; a transmitting unit for transmitting a request packet including the candidate channel list; and a receiving unit for receiving at least one response packet via at least one selected channel included in the candidate channel list from at least one receiver in response to the request packet, the at least one selected channel being available for reception at the at least one receiver; wherein the transmitting unit is configured to transmit a data packet to the receiver via the at least one selected channel after receiving the response packet.

17 Claims, 4 Drawing Sheets

(56) References Cited

U.S. PATENT DOCUMENTS

| | | | |
|---|---|---|---|
| 2009/0067403 A1* | 3/2009 | Chan .................... H04W 16/10 370/310 | |
| 2010/0054230 A1 | 3/2010 | Sridhara et al. | |
| 2011/0110351 A1 | 5/2011 | Seok | |
| 2011/0235576 A1 | 9/2011 | Gong et al. | |
| 2012/0051334 A1 | 3/2012 | Sridhara et al. | |
| 2012/0134324 A1 | 5/2012 | Chu et al. | |
| 2012/0327870 A1 | 12/2012 | Grandhi et al. | |
| 2013/0058218 A1 | 3/2013 | Wu et al. | |
| 2013/0229996 A1 | 9/2013 | Wang et al. | |
| 2014/0079016 A1 | 3/2014 | Dai et al. | |
| 2014/0098724 A1 | 4/2014 | Park et al. | |
| 2015/0078356 A1* | 3/2015 | Kwon ................ H04W 74/0816 370/338 | |
| 2015/0124749 A1 | 5/2015 | Mawlawi et al. | |
| 2015/0139137 A1 | 5/2015 | Seok | |
| 2015/0264715 A1 | 9/2015 | Hwang et al. | |
| 2015/0319780 A1 | 11/2015 | Seok | |
| 2016/0037484 A1* | 2/2016 | Kwon ................. H04W 74/004 370/312 | |

FOREIGN PATENT DOCUMENTS

| | | | |
|---|---|---|---|
| JP | 2013-71996 A | 4/2013 | |
| JP | 2013-511886 A | 4/2013 | |
| WO | 2009/154406 A2 | 12/2009 | |
| WO | 2010/024947 A1 | 3/2010 | |
| WO | 2011/004875 A1 | 1/2011 | |
| WO | WO-2012021131 A1 * | 2/2012 | ........ H04W 74/0816 |

OTHER PUBLICATIONS

International Search Report issued Jan. 25, 2016 in PCT/EP2015/074564 filed Oct. 23, 2015.

Chinese Office Action issued Sep. 10, 2019 in Chinese Application No. 2015800582895.

English translation of Decision of Refusal issued Dec. 10, 2019 in Japanese Patent Application No. 2017-523807.

\* cited by examiner

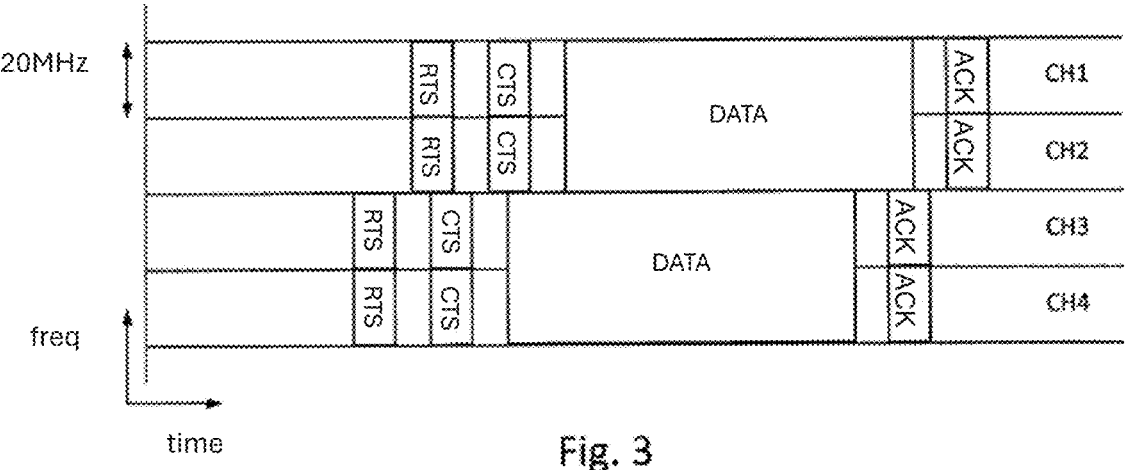
Fig. 3
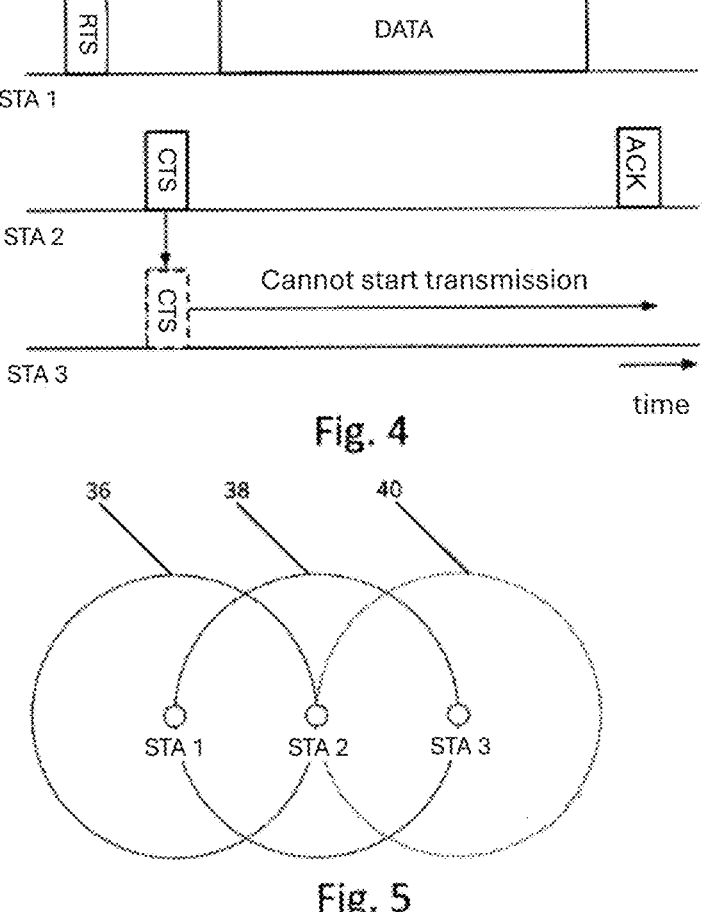
Fig. 4
Fig. 5

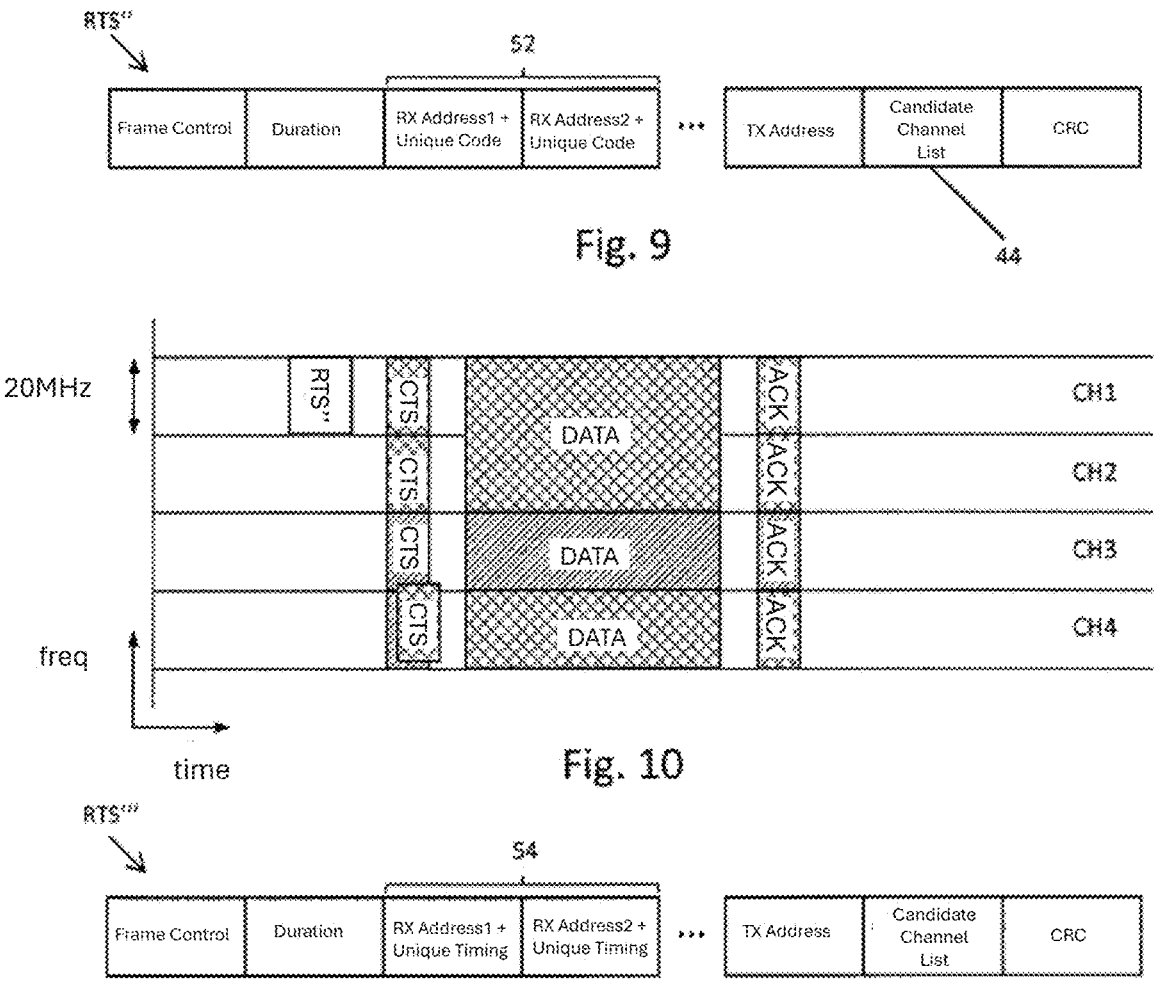
Fig. 9
Fig. 10
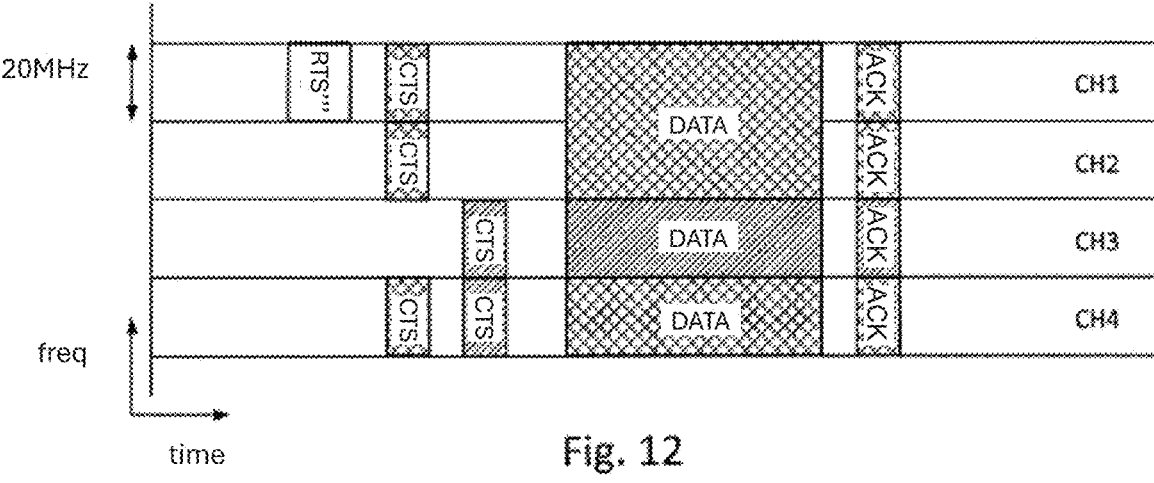
Fig. 11
Fig. 12

TRANSMITTER AND RECEIVER FOR MULTIPLE CHANNEL OPERATION

CROSS-REFERENCE TO RELATED APPLICATIONS

The present application is a continuation of U.S. application Ser. No. 15/512,851, filed Mar. 21, 2017, which is based on PCT Filing PCT/EP2015/074564, filed Oct. 23, 2015, and claims priority to European Patent Application 14191328.5, filed in the European Patent Office on Oct. 31, 2014, the entire contents of each being incorporated herein by reference.

BACKGROUND

Field of the Disclosure

The present disclosure relates to a transmitter for transmitting data as well as to a receiver for receiving data in a wireless local area network communication system. Further, the present disclosure relates to corresponding methods. Still further, the present disclosure relates to a circuitry for transmitting data and to a circuitry for receiving data implementing the functionalities of the transmitter and the receiver as well as to a wireless local area network communication system.

Description of Related Art

IEEE 802.11 (a.k.a. WiFi) Technology has evolved over the years, and currently 802.11ax is being standardized. One key feature that is being discussed in .11ax is the enhancement of multiple channel operation. In early .11 standards like .11a, single 20 MHz operation was imposed. When this evolved to .11n, bonding of two 20 MHz contiguous channels (=40 MHz) operation was allowed, enabling faster data rates. Latest market-ready release .11ac allows for up to 80 MHz (optional 80 MHz×2=160 MHz) operation. An overview of the 802.11ac standard is given in the Cisco systems technical white paper "802.11ac: The Fifth Generation of Wi-Fi"; March 2014 (available online). One difficulty of wireless communication technology becoming more and more popular is that the operating channels (wireless frequencies) become more crowded and that it has become harder to find wide contiguous frequency resource to transmit these multichannel packets.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a transmitter for transmitting data and a receiver for receiving data in a wireless local area communication system that allow a more flexible multichannel operation. It is a further object to provide corresponding circuitry for implementing corresponding transmitter and receiver functionalities in hardware. It is yet a further object to provide corresponding methods for transmitting and receiving data as well as a corresponding computer program for implementing the methods in software and a non-transitory computer-readable medium storing said software. Further, a wireless local area network communication system shall be provided.

According to an aspect of the present disclosure there is provided a transmitter for transmitting data to a receiver in a wireless local area network communication system, comprising: a candidate channel determination unit configured to determine a candidate channel list including at least one channel being available for transmission at the transmitter; a transmitting unit for transmitting a request packet including said candidate channel list; and a receiving unit for receiving at least one response packet via at least one selected channel included in the candidate channel list from at least one receiver in response to the request packet, said at least one selected channel being available for reception at the at least one receiver; wherein the transmitting unit is configured to transmit a data packet to the receiver via the at least one selected channel after receiving the response packet.

According to a further aspect there is provided a receiver for receiving data from a transmitter in a wireless local area network communication system, comprising: a receiving unit for receiving a request packet including a candidate channel list including at least one channel being available for transmission at the transmitter; a channel selection unit configured to select from the candidate channel list at least one selected channel being available for reception at the receiver; and a transmitting unit for transmitting a response packet via the at least one selected channel to the transmitter in response to the request packet; wherein the receiving unit is configured to receive a data packet from the transmitter via the at least one selected channel after transmitting the response packet.

According to yet another aspect there is provided a wireless local area network communication system including a transmitter as described above and a receiver as described above.

According to an aspect there is provided a circuitry for transmitting data to a receiver in a wireless local area network communication system, comprising: a candidate channel determination portion configured to determine a candidate channel list including at least one channel being available for transmission at the transmitter; a transmitting portion for transmitting a request packet including said candidate channel list; and a receiving portion for receiving at least one response packet via at least one selected channel included in the candidate channel list from at least one receiver in response to the request packet, said at least one selected channel being available for reception at the at least one receiver; wherein the transmitting portion is configured to transmit a data packet to the receiver via the at least one selected channel after receiving the response packet.

According to an aspect, there is provided a circuitry for receiving data from a transmitter in a wireless local area network communication system, comprising: a receiving portion for receiving a request packet including a candidate channel list including at least one channel being available for transmission at the transmitter; a channel selection portion configured to select from the candidate channel list at least one selected channel being available for reception at the receiver; and a transmitting portion for transmitting a response packet via the at least one selected channel to the transmitter in response to the request packet; wherein the receiving portion is configured to receive a data packet from the transmitter via the at least one selected channel after transmitting the response packet.

According to an aspect, there is provided a method for transmitting data from a transmitter to a receiver in a wireless local area network communication system, comprising: determining a candidate channel list including at least one channel being available for transmission at the transmitter; transmitting a request packet including said candidate channel list; receiving at least one response packet via at least one selected channel included in the candidate channel list from at least one receiver in response to the request packet, said at least one selected channel being available for reception at the at least one receiver; and transmitting a data packet to the receiver via the at least one selected channel after receiving the response packet.

According to an aspect, there is provided a method for receiving data at a receiver from a transmitter in a wireless local area network communication system, comprising: receiving a request packet including a candidate channel list including at least one channel being available for transmission at the transmitter; selecting from the candidate channel list at least one selected channel being available for reception at the receiver; transmitting a response packet via the at least one selected channel to the transmitter in response to the request packet; and receiving a data packet from the transmitter via the at least one selected channel after the transmitting the response packet.

According to still further aspects a computer program comprising program means for causing a computer to carry out the steps of the transmitting or receiving method disclosed herein, when said computer program is carried out on a computer, as well as a non-transitory computer-readable recording medium that stores therein a computer program product, which, when executed by a processor, causes the transmitting or receiving method disclosed herein to be performed are provided.

Preferred embodiments are defined in the dependent claims. It shall be understood that the disclosed methods for transmitting and receiving data, the disclosed circuitry, the disclosed computer program and the disclosed computer-readable recording medium have similar and/or identical preferred embodiments as the claimed transmitter and receiver and as defined in the dependent claims.

One of the aspects of the disclosure is to provide an approach to a more flexible multichannel operation to potentially be adopted for the IEEE 802.11ax standard. In particular, it is desired to allow multichannel operation in multiple non-contiguous channels or frequency bands. In a transmitter in a wireless local area network (WLAN) communication system (also called WiFi transmitter) according to the present disclosure it is initially determined a list including channels that are available for transmission of data. In particular, a channel being available means that the channel is not occupied by other communication. It is assessed which channels are available and a candidate channel list is derived based thereupon. Then, a request packet (also referred to as a request to send, RTS, packet herein) is transmitted. This request packet includes the candidate channel list. The request packet is received at a receiver, which selects from the channels in the candidate channel list the channels that are also available for communication at the receiver (also referred to as selected channels herein). Thus, the receiver obtains the information on the channels available at the transmitter and further, if needed, narrows down this list by excluding channels that are occupied from its point of view. Then, the receiver transmits a response packet (also referred to as a clear to send, CTS, packet herein) via the available channels (i.e. the selected channels) to indicate to the transmitter that it is ready to receive a data packet via the selected channels. The receiving unit in the transmitter receives the response packet from the receiver and thereby obtains information on channels that are also available at the receiver (in addition to being available at the transmitter). After this procedure (handshake procedure) the transmitter may transmit a data packet to the receiver via one or more of the selected channels.

Thereby, it is possible that the transmitting unit in the transmitter transmits the request packet via a channel in the candidate channel list or via another channel, e.g. a predefined control channel or the like. The request packet may also be transmitted via multiple channels. After having obtained the information on the one or more selected channels, i.e. the channels that are available for transmission at both the transmitter and the receiver, the transmitting unit of the transmitter can start the transmission of the data packet via a single channel or via a plurality of contiguous or non-contiguous channels (a combination of channels) of the selected channels.

The transmitter and receiver of the present disclosure thereby make it possible to transmit data via single channels or in the form of a multichannel transmission via contiguous or non-contiguous channels. In contrast to known approaches, in which it is usually relied on either the transmission via a single channel or the transmission via two or more contiguous channels, the additional consideration of a transmission via non-contiguous channels as proposed by the present disclosure allows obtaining a comparably high data rate in spite of not having to wait until contiguous channels are available.

Another advantage is that a better coexistence of different WiFi systems can be assured. The higher flexibility of the proposed multichannel operation resulting from the use of the candidate channel list of the present disclosure makes a more efficient use of the available bandwidth possible.

Embodiments of the present disclosure allow a transmitter to communicate with a plurality of receiver. For this, a list of addressees may included in the request packet.

In embodiments of the present disclosure it is proposed to make use of a unique code and/or a unique timing that is transmitted along with the candidate channel list in the request packet. Thereby, each receiver (e.g. in case of a multicast transmission) is attributed a unique code or a unique timing. Based on this information the receiver can control the transmission of the response packet to allow its identification by the transmitter upon receipt of the response packet. For instance, the receiver may code the response packet with its individual unique code. The transmitter can then determine the code and identify the receiver based thereupon. Alternatively, the receiver may transmit the response packet at a point in time corresponding to his individual unique timing. The transmitter may then determine from which receiver this response packet has been obtained based on the timing of the received response packet (i.e. the time slot at which the response packet is received). This is particularly advantageous since a response packet usually not includes information on its origin, i.e. information on which receiver has transmitted it.

In the context of the present disclosure both the transmitting unit and the receiving unit are preferably configured to transmit and receive packets in compliance with the IEEE 802.11 standard. Preferably, a channel will corresponds to a channel as specified by the IEEE 802.11 standard.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 schematically illustrates the operation of a IEEE 802.11n WLAN system;

FIG. 4 schematically illustrates an RTS/CTS handshake packet exchange procedure in a WLAN system;

FIG. 5 schematically illustrates the so-called hidden terminal problem in a wireless transmission system;

FIG. 9 illustrates a packet structure (frame structure) of a request packet with a unique code attributed to a receiver according to an aspect of the present disclosure;

FIG. 10 schematically illustrates an example for a data transmission procedure as carried out by a transmitter and a receiver according to the present disclosure with a unique code allocation;

FIG. 11 illustrates a packet structure (frame structure) of a request packet with a unique timing attributed to a receiver according to an aspect of the present disclosure;

FIG. 12 schematically illustrates an example for a data transmission procedure as carried out by a transmitter and a receiver according to the present disclosure with a unique timing of the response packets.

DETAILED DESCRIPTION OF THE EMBODIMENTS

Figure 1:
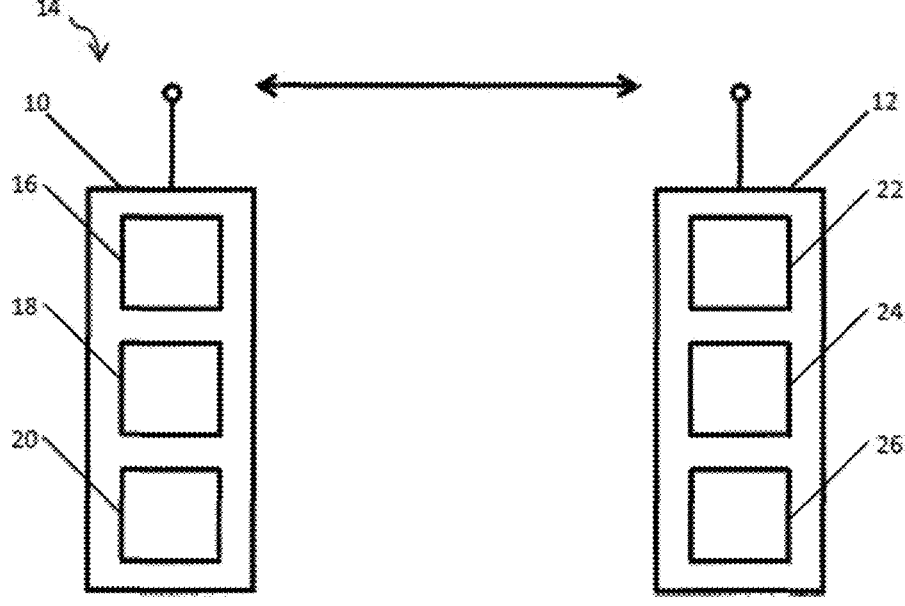
FIG. 1 shows a schematic illustration of a wireless local area network communication system including a transmitter for transmitting data and a corresponding receiver to receive data according to an aspect of the present disclosure.

Referring now to the drawings, wherein like reference numerals designate identical or corresponding parts throughout the several views, FIG. 1 shows the operation of a transmitter 10 and a receiver 12 in a wireless area network communication system 14 according to the present disclosure. The transmitter 10 desires to transmit data, i.e. a data packet, to the receiver 12. The transmitter 10 includes a candidate channel determination unit 16 configured to determine a candidate channel list, a transmitting unit 18 for transmitting a request packet, and a receiving unit 20 for receiving at least one response packet. The transmitting unit 18 of the transmitter is configured to transmit a data packet to the receiver 12. The corresponding receiver 12 includes a receiving unit 22 for receiving a request packet, a channel selection unit 24 configured to select at least one channel from the candidate channel list obtained from the transmitter and a transmitting unit 26 for transmitting a response packet to the transmitter 10. Further, the receiving unit 22 is configured to receive a data packet from the transmitter 10.

A transmitter and a receiver according to the present disclosure may be built upon the same hardware, i.e. a device will be able to function as a transmitter or as a receiver. It may also be possible that a method according to the present disclosure is carried out to control a software defined radio. The control will the usually be executed by a controller. In most cases, a transmitter or a receiver according to the present disclosure will be implemented in the form of hardware, i.e. in the form of an integrated circuit (IC).

Figure 2:
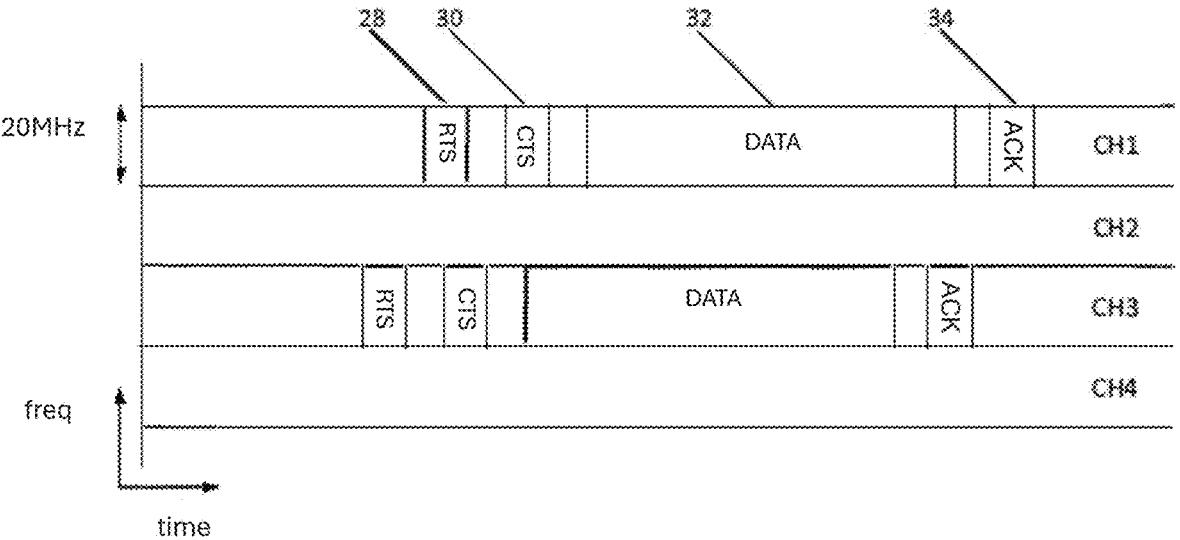
FIG. 2 schematically illustrates the operation of an IEEE 802.11a WLAN system.

In FIG. 2 it is illustrated how a data packet is usually transmitted in an IEEE 802.11a standard-conform WIFI system. The transmission is illustrated by means of a diagram in which the y-axis represents the available channels (i.e. frequency bands) and the x-axis represents the time. In the outlined example, there are 4 different 20 MHz channels CH1-CH4.

A transmitter desires to transmit a data packet to a receiver. Initially, the transmitter transmits a request packet 28 (request to send, RTS) to indicate that data is queued for transmission. In response thereto, the receiver transmits a response packet 30 (clear to send, CTS) to indicate its readiness to receive the data. After this so-called handshake procedure, a data packet 32 can be transmitted from the transmitter to the receiver. In a last step the receiver acknowledges the receipt of the data packet 32 by means of an acknowledgement (ACK) packet 34.

As illustrated in FIG. 2 it is possible that multiple transmissions are carried out simultaneously via different channels without affecting one another since different channels are used.

In FIG. 3 the operation of an IEEE 802.11n standard-conform system is schematically illustrated. According to this standard, it is also possible to transmit a data packet via two or more contiguous channels (e.g. two channels corresponding to a 40 MHz channel, which may also be referred to as a combined channel). This allows obtaining a higher data rate. As illustrated in FIG. 3, it is possible that the request and response packets RTS, CTS are transmitted via two 20 MHz channels. It is, however, also possible that only one channel is used for the transmission of the response and/or request packets but that multiple channels are used for the data packet (not illustrated).

In FIG. 4 it is schematically illustrated how this procedure works in case of three different stations STA1-STA3 in the vicinity of one another as perceived by the three stations. The first station STA1 sends a request packet RTS. This request packet indicates that it is willing to transmit a data packet. Further, the request packet RTS will usually indicate the expected time for this transaction. The second station (receiver) STA2 replies with a response packet CTS which indicates that it is ready to receive the data packet. This response packet is also useful to protect the transmission of the data packet from disturbances resulting from a third station STA3. It is indicated in FIG. 4 that the third station STA3 receiving the response packet CTS from the second station STA2 will understand therefrom that it should not start another transmission to avoid disturbing the communication of the data packet from the first station STA1 to the second station STA2.

In FIG. 5 the so-called hidden terminal or hidden station problem is illustrated. This problem is immanent to most wireless communication systems. The circles 36-38 around the three stations STA1-STA3 indicate their communication or signal ranges. Within these ranges a transmission from the respective station may disturb another transmission. Wireless communication makes use of a shared medium. The problem resulting from a shared medium is that only one transmission can be carried out at the same time. Thus, as illustrated in FIG. 5, if the first station STA1 desires to transmit a data packet to the second station STA2, it is possible that the third station STA3 disturbs this transmission since the second station STA2 is within communication range 40 of the third station STA3 although the third station STA3 has no chance to observe that the first station STA1 desires to transmit a data packet to the second station STA2 since the first station STA1 is out of the communication range 40 of the third station STA3. This problem can be avoided by making use of the above-outlined RTS/CTS handshake.

Figure 6:
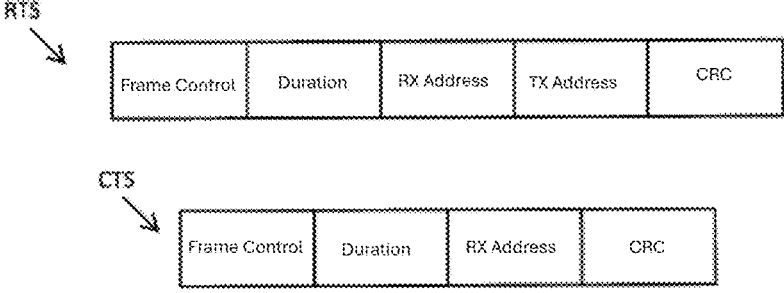
FIG. 6 schematically illustrates the packet structure of an RTS packet and a CTS packet.

In FIG. 6 the different fields in a request packet RTS and in a response packet CTS are illustrated. Both packet structures are IEEE 802.11 standard-conform. It can be seen that the request packet RTS usually includes an address of the intended recipient (RX address) and an address of the sender (TX address) in contrast thereto, the response packet CTS does usually not include an address of the sender (TX address). Consequently, the recipient of the response packet CTS will not know which device sent this frame.

Figure 7:
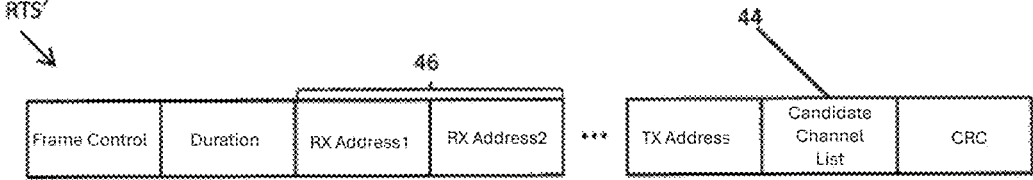
FIG. 7 illustrates a packet structure (frame structure) of a request packet according to an aspect of the present disclosure.

In FIG. 7 a frame structure of a request packet RTS' (also referred to as multi-RTS packet, MR) according to the present disclosure is schematically illustrated. In contrast to previous frame structures as illustrated in FIG. 6 the request packet RTS' of the present disclosure additionally includes a candidate channel list 44. This candidate channel list may be represented by a data structure that describes different channels. For instance, the candidate channel list may simply correspond to a plurality of channel IDs.

Prior to transmitting the request packet RTS' the candidate channel determination unit of the transmitter determines which channels are currently available for transmission. For instance, in a communication system in which four channels are standardized it may be possible that two of these channels are currently occupied by other devices or because of disturbances. The candidate channel determination unit may, e.g., measure the power density on all channels and determine based thereupon the IDs of occupied channels. Then, the candidate channel list 44 may be derived. This list 44 includes the IDs of the channel that are free, i.e. that are currently not in use and therefor available for transmission at the transmitter.

This candidate channel list 44 is included in the request packet RTS' and transmitted to a receiver. The receiver extracts from the received packet the candidate channel list 44 and compares the channels of the candidate channel list with the channels that are available at the receiver. For this, a channel selection unit in the receiver may function similarly to the candidate channel determination unit in the transmitter. The different available channels are evaluated for their availability for transmission (or reception, respectively). For instance, to stay with the above-outlined example, the candidate channel list includes two channels that are available for transmission at the transmitter. From these two channels the channel selection unit in the receiver may select only one channel which is also available for transmission or reception at the receiver. It may be possible that some channels are not available for transmission at the transmitter but at the receiver. These channels, however, will not be included in the selected channels.

Furthermore, the request packet RTS' of the present disclosure may optionally also include a plurality of receiver addresses 46 in case a data packet is to be transmitted to multiple receivers (multicast environment) or in case different data packets are to be transmitted to different receivers.

Figure 8:
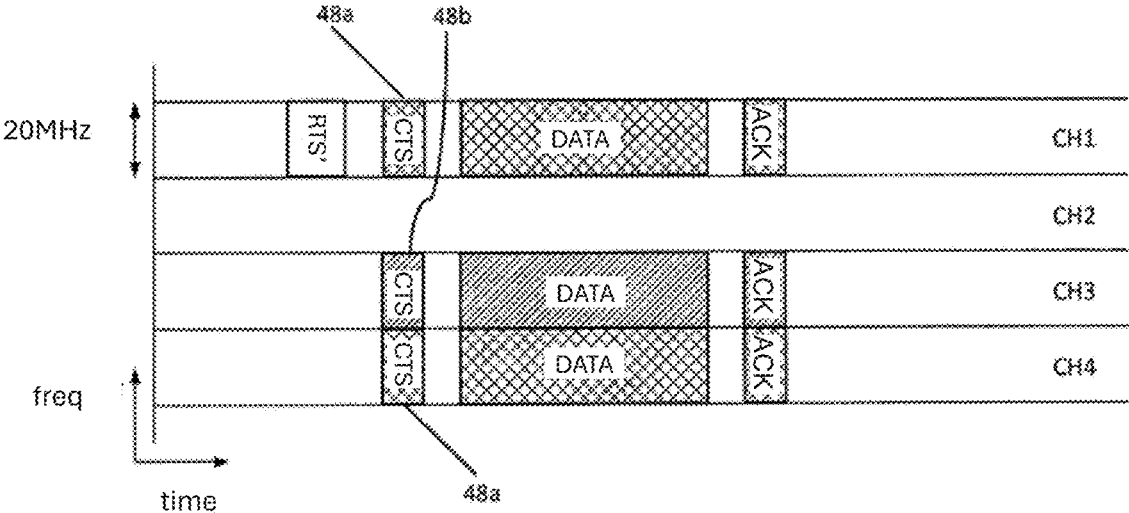
FIG. 8 schematically illustrates a data transmission procedure as carried out by a transmitter and a receiver according to the present disclosure.

In FIG. 8 it is illustrated that after having sent a request packet RTS', the transmitter may receive a plurality of response packets CTS by means of its receiving unit. Thereby, it is possible that the RTS' packet is sent via one of the selected channels, vial an additional control channel or also via multiple channels.

According to the present disclosure the receiver transmits its response packet CTS in the selected channels. In the situation illustrated in FIG. 8, it is indicated that one receiver may send its response packet CTS via two different channels CH1 and CH4. Another receiver may send a response packet 48B via one channel CH3. Thus, the addressee (i.e. the receiver) will send a response packet on channels that are included in the candidate channel list and that are available for transmission at the receiver (selected channels). The transmitter can derive the selected channels from the channels via which it receives the response packets. Then, the transmitter may transmit the data packet to the receiver.

As indicated in FIG. 8 it is possible that the transmitter is in communication with two different receivers as illustrated by the different textures of the response packets CTS and data packets.

The transmitter does not have a priory knowledge about which channel is clear, i.e. available for transmission at the receiver. Furthermore, the response packet CTS does not include an address of the receiver by which it was sent. Consequently, a situation where multiple receivers are present (as illustrated in FIG. 8) may result in an allocation problem.

One way to allow distinguishing between different receivers is to make use of some sort of orthogonalization. For this, a unique code per receiver can be allocated (by the transmitter). In FIG. 9 a packet structure of a corresponding request packet RTS" including such a unique code is illustrated. In addition to the candidate channel list 44 there is included a unique code corresponding to each of a plurality of receiver addresses 52. It is to be understood that there may also be included only one receiver address if data is to be transmitted to one receiver only. This unique code can then be applied to the response packet CTS by the receiver. Applying a code may thereby particularly refer to orthogonalization coding. Upon receipt of a response packet to which such a unique code has been applied, the transmitter may determine the origin of this response packet, i.e. which receiver has sent this response packet, by evaluating the code applied to the response packet.

FIG. 10 illustrates an example for a corresponding communication procedure. First, a request packet RTS" is transmitted by the transmitting unit in the transmitter. Again, it may also be possible that the request packet RTS" is transmitted via multiple channels or via another channel. In reply thereto, the receiving unit of the transmitter receives five response packets CTS on four different channels CH1-CH4. As indicated by the different textures of the response packets CTS, three of these actually originate from the same receiver and thereby indicate the selected channels of this receiver. In other words, the same response packet is obtained from one receiver via channels CH1, CH2 and CH4. Thus channels CH1, CH2 and CH4 correspond to the selected channels of this receiver. Additionally, another response packet is obtained via channels CH3 and CH4 from another receiver thereby indicating the selected channels of this receiver. The transmitter can identify the respective receiver by evaluating the code applied to the response packet. In the illustrated situation, the transmitter may decide for the fourth channel whether to use it to communicate to first or the second receiver.

In particular, the candidate channel list of the present disclosure allows transmitting a data packet to one transmitter via two or more non-contiguous channels (CH1, CH2 and CH4 in the illustrated example). This is also referred to as transmitting a data packet via a combined channel. It may, in exceptional cases, also be possible that a response packet is received via one selected channel but that the data packet is anyway transmitted via a combined channel.

Alternatively, it also possible that, instead of assigning a unique code to each receiver, a unique timing is assigned to each receiver as illustrated in FIG. 11. The request packet RTS''' as illustrated in FIG. 11 includes a list of receiver addresses 54 and a unique timing per receiver. Again, it is to be understood that also only one receiver may be addressed. The unique timing may particularly correspond to a time slot at which the receiver is to transmit the response packet CTS. This time slot may be assigned by the transmitter to allow identifying the sender of a response packet.

FIG. 12 illustrates a corresponding communication procedure. Again, the transmitter transmits a request packet RTS''. This time, however, the different receivers send the corresponding response packets CTS with the received unique timing, i.e. at different time slots. It can be seen in FIG. 12 that one receiver, indicated by a first texture, sends its response packet CTS via channels CH1, CH2 and CH4. The other receiver sends its response packet via channels CH3 and CH4. This method has the advantage that no unique code needs to be allocated. However, usually more overhead, i.e. higher time consumption, will result therefrom.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such software may also be distributed in other forms, such as via the Internet or other wired or wireless telecommunication systems. A method according to the present invention may particularly be carried out to control the operation of a software defined radio.

The elements of the disclosed devices, circuitry and system may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A transmitter for transmitting data to a receiver in a wireless local area network communication system, comprising:
   a candidate channel determination unit configured to determine a candidate channel list including at least one channel being available for transmission at the transmitter;
   a transmitting unit for transmitting a request packet including said candidate channel list; and
   a receiving unit for receiving at least one response packet via at least one selected channel included in the candidate channel list from at least one receiver in response to the request packet, said at least one selected channel being available for reception at the at least one receiver;
   wherein the transmitting unit is configured to transmit a data packet to the receiver via the at least one selected channel after receiving the response packet.

2. The transmitter as defined in embodiment 1, wherein the transmitting unit is configured to transmit the request packet via a channel in the candidate channel list.

3. The transmitter as defined in any preceding embodiment, wherein the transmitting unit is configured to transmit the request packet via all channels in the candidate channel list.

4. The transmitter as defined in any preceding embodiment, wherein the transmitting unit is configured to transmit the data packet via a combined channel corresponding to a combination of at least two contiguous or non-contiguous channels of the selected channels when the response packet is received via at least two selected channels.

5. The transmitter as defined in any preceding embodiment, wherein the request packet further includes a unique code and/or a unique timing corresponding to the receiver; and the transmitting unit is configured to identify the receiver from which a response packet is received via at least one selected channel included in the candidate channel list in response to the request packet based on a code applied to the response packet and/or a timing of the response packet.

6. The transmitter as defined in embodiment 5, wherein the transmitting unit is configured to transmit to said identified receiver a data packet intended for said identified receiver via the at least one selected channel included in the candidate channel list.

7. The transmitter as defined in any preceding embodiment, wherein the transmitting unit and the receiving unit are configured to transmit and receive packets in compliance with the IEEE 802.11 standard; and/or the at least one channel in the candidate channel list is determined based on the channels as specified by the IEEE 802.11 standard.

8. The transmitter as defined in any preceding embodiment, wherein the transmitting unit is configured to transmit a data packet to a plurality of receivers via a channel being available for reception at each receiver of the plurality of receivers.

9. The transmitter as defined in any preceding embodiment, wherein the transmitting unit is configured to transmit the data packet via a combined channel corresponding to a combination of at least two contiguous or non-contiguous channels of the selected channels when the response packet is received via at least one selected channels.

10. A receiver for receiving data from a transmitter in a wireless local area network communication system, comprising:

a receiving unit for receiving a request packet including a candidate channel list including at least one channel being available for transmission at the transmitter;

a channel selection unit configured to select from the candidate channel list at least one selected channel being available for reception at the receiver; and a transmitting unit for transmitting a response packet via the at least one selected channel to the transmitter in response to the request packet;

wherein the receiving unit is configured to receive a data packet from the transmitter via the at least one selected channel after transmitting the response packet.

11. The receiver as defined in embodiment 10 wherein the receiving unit is configured to receive the request packet via a channel in the candidate channel list.

12. The receiver as defined in any of the embodiments 9-11, wherein the receiving unit is configured to receive the request packet via all channels in the candidate channel list.

13. The receiver as defined in any of the embodiments 9-12, wherein the receiving unit is configured to receive the data packet via a combined channel corresponding to a combination of at least two contiguous or non-contiguous channels of the selected channels when the response packet is transmitted via at least two selected channels.

14. The receiver as defined in any of the embodiments embodiment 9-13, wherein the request packet further includes a unique code and/or a unique timing corresponding to the receiver; and the transmitting unit is configured to apply the unique code to the response packet prior to transmitting the response packet and/or to control the transmitting unit to transmit the response packet with the received unique timing.

15. The receiver as defined in any of the embodiments 9-14, wherein the transmitting unit and the receiving unit are configured to transmit and receive packets in compliance with the IEEE 802.11 standard; and/or the at least one channel in the candidate channel list is determined based on the channels as specified by the IEEE 802.11 standard.

16. A wireless local area network communication system including a transmitter as defined in embodiment 1 and a receiver as defined in embodiment 10.

17. A circuitry for transmitting data to a receiver in a wireless local area network communication system, comprising:

a candidate channel determination portion configured to determine a candidate channel list including at least one channel being available for transmission at the transmitter;

a transmitting portion for transmitting a request packet including said candidate channel list; and a receiving portion for receiving at least one response packet via at least one selected channel included in the candidate channel list from at least one receiver in response to the request packet, said at least one selected channel being available for reception at the at least one receiver;

wherein the transmitting portion is configured to transmit a data packet to the receiver via the at least one selected channel after receiving the response packet.

18. A circuitry for receiving data from a transmitter in a wireless local area network communication system, comprising:

a receiving portion for receiving a request packet including a candidate channel list including at least one channel being available for transmission at the transmitter;

a channel selection portion configured to select from the candidate channel list at least one selected channel being available for reception at the receiver; and a transmitting portion for transmitting a response packet via the at least one selected channel to the transmitter in response to the request packet;

wherein the receiving portion is configured to receive a data packet from the transmitter via the at least one selected channel after transmitting the response packet.

19. A method for transmitting data from a transmitter to a receiver in a wireless local area network communication system, comprising:

determining a candidate channel list including at least one channel being available for transmission at the transmitter;

transmitting a request packet including said candidate channel list;

receiving at least one response packet via at least one selected channel included in the candidate channel list from at least one receiver in response to the request packet, said at least one selected channel being available for reception at the at least one receiver; and transmitting a data packet to the receiver via the at least one selected channel after receiving the response packet.

20. A method for receiving data at a receiver from a transmitter in a wireless local area network communication system, comprising:

receiving a request packet including a candidate channel list including at least one channel being available for transmission at the transmitter;

selecting from the candidate channel list at least one selected channel being available for reception at the receiver;

transmitting a response packet via the at least one selected channel to the transmitter in response to the request packet; and receiving a data packet from the transmitter via the at least one selected channel after the transmitting the response packet.

21. A non-transitory computer-readable recording medium that stores therein a computer program product, which, when executed by a processor, causes the method according to embodiment 19 or 20 to be performed.

22. The receiver as defined in any of the embodiments 10-15, wherein the transmitting unit is configured to transmit an acknowledgement packet to the transmitter when a data packet from the transmitter is received via the at least one selected channel after the transmission of the response packet.

The invention claimed is:

1. A device for transmitting data to a receiver in a wireless local area network communication system, said device comprising circuitry including a processor and a memory coupled to the processor, the processor configured to:

determine a candidate channel list including at least one channel available for transmission at the transmitter;

transmit a request packet including said candidate channel list, a plurality of receiver addresses, and a request to transmit a data packet;

receive at least one response packet via at least one selected channel included in the candidate channel list from at least one receiver in response to the request packet, said at least one selected channel being available for reception at the at least one receiver; and transmit the data packet to the receiver via the at least one selected channel after receiving the response packet, wherein the request packet further includes a unique code corresponding to the receiver, the unique code determined according to orthogonalization coding; and the circuitry is configured to identify the receiver from which a response packet is received via at least one selected channel included in the candidate channel list in response to the request packet based on the unique code which is applied to the response packet, and the at least one selected channel is a combined channel corresponding to a combination of at least two non-contiguous channels of the selected channels.

2. The device as claimed in claim 1, wherein the processor is configured to transmit the request packet via a channel in the candidate channel list.

3. The device as claimed in claim 1, wherein the processor is configured to transmit the request packet via all channels in the candidate channel list.

4. The device as claimed in claim 1, wherein the processor is configured to transmit to said identified receiver a data packet intended for said identified receiver via the at least one selected channel included in the candidate channel list.

5. The device as claimed in claim 1, wherein the processor is configured to transmit and receive packets in compliance with the IEEE 802.11 standard; and/or the at least one channel in the candidate channel list is determined based on the channels as specified by the IEEE 802.11 standard.

6. The device as claimed in claim 1, wherein the processor is configured to transmit a data packet to a plurality of receivers via a channel being available for reception at each receiver of the plurality of receivers.

7. A device for receiving data from a transmitter in a wireless local area network communication system, said device comprising circuitry including a processor and a memory coupled to the processor, the processor configured to:

receive a request packet including a candidate channel list including at least one channel available for transmission at the transmitter, a plurality of receiver addresses, and a request to transmit a data packet;

select from the candidate channel list at least one selected channel being available for reception at the receiver; and transmit a response packet via the at least one selected channel to the transmitter in response to the request packet; and receive the data packet from the transmitter via the at least one selected channel after transmitting the response packet, wherein the request packet further includes a unique code corresponding to the receiver, the unique code determined according to orthogonalization coding;

the circuitry is configured to apply the unique code to the response packet prior to transmitting the response packet; and the at least one selected channel is a combined channel corresponding to a combination of at least two non-contiguous channels of the selected channels.

8. The device as claimed in claim 7, wherein the processor circuitry is configured to receive the request packet via a channel in the candidate channel list.

9. The device as claimed in claim 7, wherein the processor circuitry is configured to receive the request packet via all channels in the candidate channel list.

10. The device as claimed in claim 1, wherein the request packet is a request-to-send (RTS) packet.

11. The device as claimed in claim 10, wherein the RTS packet includes a plurality of receiver addresses.

12. The device as claimed in claim 10, wherein the RTS packet further includes an expected transmission time for the data packet.

13. The device as claimed in claim 1, wherein the processor determines the candidate channel list based on power density measurements on all available channels.

14. The device as claimed in claim 1, wherein the candidate channel list identifies the at least one channel via a channel identifier.

15. The device as claimed in claim 1, wherein the at least one selected channel from the candidate channel list through which the at least one response packet is received is different than a channel through which the request packet is transmitted.

16. The device as claimed in claim 1, wherein the response packet is received via more than one channel of the candidate channel list.

17. The device according to claim 1, wherein the request packet further includes a transmitter address.

* * * * *